(12) United States Patent
Kato et al.

(10) Patent No.: US 6,371,648 B1
(45) Date of Patent: Apr. 16, 2002

(54) LINEAR GUIDE DEVICE

(75) Inventors: Soichiro Kato; Shiroji Yabe; Yoshinori Mizumura; Hiroki Yamaguchi; Nobumitsu Takahashi; Ryoichi Sato, all of Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/447,572

(22) Filed: Nov. 23, 1999

(30) Foreign Application Priority Data

Nov. 25, 1998 (JP) .......................................... 10-334027

(51) Int. Cl.$^7$ .............................................. F16C 29/06
(52) U.S. Cl. ......................................................... 384/45
(58) Field of Search ............................. 384/45, 43, 44; 464/168

(56) References Cited

FOREIGN PATENT DOCUMENTS

| JP | 62-11215 | 3/1987 |
|----|----------|--------|
| JP | 7-208467 | 8/1995 |

*Primary Examiner*—Lenard A. Footland
(74) *Attorney, Agent, or Firm*—Miles & Stockbridge P.C.

(57) ABSTRACT

In order to reduce the amount of play of balls in a circulation path in a linear guide device to thereby reduce the noise during the running of the linear guide device and improve the quality and productivity of the device, the communicating portion of the straight portion of a ball circulation path in a slider body and the curved portions of ball circulation paths in end caps is constituted by faucet-fitting comprising a cylindrical convex portion provided so as to extend the curved portions relative to the communicating portion and a cylinder concave portion corresponding to the cylindrical convex portion provided in the straight portion.

4 Claims, 8 Drawing Sheets

LINEAR GUIDE DEVICE

BACKGROUND OF THE INVENTION

1. Field of the invention

This invention relates to a linear guide device used for linear sliding in an industrial machine or the like, and particularly to improvements in ball circulating parts in the device.

2. Related Background Art

The appearances of a linear guide device in the prior art are shown in FIG. 15 of the accompanying drawings, and a cross-sectional view along the direction of line 16—16 of FIG. 15 showing the internal structure thereof is shown in FIG. 16 of the accompanying drawings. As shown, the linear guide device is comprised of a guide rail 50 having in the outer surface thereof a groove portion 57 receiving therein rolling members, i.e., balls 51 for rolling and extending axially, and a slider 60 having therein a circulation path 4 for the balls 51 and held for sliding on the guide rail 50 by the balls 51 in a groove portion 7 (see FIG. 11 of the accompanying drawings) opposed to the groove portion 57. The balls 51 are held in the circulation path 4 and between the two groove portions 57 and 7 and roll in the circulation path 4 and between the two groove portions 57 and 7 with the sliding movement of the slider 60. The slider 60 is comprised of a slider body 1 having the circulation path straight portion 5 of the ball circulation path 4 and an end cap 2 having a circulation path curved portion 6 communicated with the straight portion 5 and between the two groove portions 57 and 7 to thereby make the ball circulation path 4 into an endless track.

As the ball circulating parts in the linear guide device heretofore used, i.e., the slide body 1 and the end cap 2, mention may be made of ones disclosed in Japanese Patent Publication No. 62-11215 shown, for example, in FIGS. 11 and 12 of the accompanying drawings. FIG. 11 is a view of the joined surface in the slider body 1 with the end cap 2 as it is seen from the direction of joint, and FIG. 12 is a view of the joined surface in the end cap 2 with the slider body 1 as it is seen from the direction of joint.

The slider body 1 is formed with the straight portions 5 of the circulation path, and the grooves 7 for the balls 51 to support the slider 60 relative to the guide rail 50 and further, the opening portions of the straight portions 5 of the circulation path are formed with tapered surfaces 20 having their opening diameter enlarged toward the opening portions. In FIGS. 11 and 12, the reference numeral 21 designates mounting threaded holes for mounting the end cap 2 on the slider body 1, and the reference numeral 30 denotes chamfered portions for facilitating the rolling of the balls 51.

The end cap 2 is formed with the circulation path curved portions 6 which are semicylindrical holes relative to the vertical direction in the plane of the drawing sheet and are concave grooves having a semicircular cross-section along the circumferential surfaces of the semicylindrical holes and which communicate with the straight portions of the circulation path of the slide body and a ball holding portion formed between the groove portions 7 of the slider body and the groove portion 57 of the guide rail 50. The reference numeral 22 designates through-holes for passing therethrough screws for mounting the end cap 2 on the slider body 1, and the reference numeral 31 denotes a pickup portion for picking up the balls 51 into the circulation path curved portions 6.

The communicating portion in the circulation path curved portions 6 with the circulation path straight portions 5 of the slider body 1, as shown in FIG. 13 of the accompanying drawings which schematically shows the cross-section of the communicating portion (fitting portion), is formed with a substantially circular-ring-like protruding portion 25 formed with a taper fitted correspondingly to the tapered surfaces 20 in the circulation path straight portions 5, and the slider body and the end cap are designed to be faucet-fitted to each other in this communicating portion. Further, a tapered portion 26 increasing its opening diameter relative to the communicating portion is formed on the inner surface of the substantially circular-ring-like portion of the protruding portion 25 in the end cap 2 so that the smooth circulation of the balls may be obtained.

However, in the faucet-fitted portion as shown above, the fitted portion is formed by the tapered surfaces 20 of the slider body 1 and the protruding portion 25 of the end cap 2, and when an error of positional dimensions occurs to the fitted portion, it is difficult to absorb it by the elastic deformation in the fitted portion. That is, when as shown in FIG. 14 of the accompanying drawings which schematically shows a cross-sectional view of the fitted portion, an error of positional dimensions occurs between the center of the circulation path straight portions 5 and the center of the protruding portion 25 lying in the opening portion of the circulation path curved portion 6, there has been the undesirable possibility that the slider body 1 and the end cap 2 do not closely contact with each other and a gap or a level difference of unexpected magnitude is created even on the endless track of the balls.

Here, when the diameter of the circulation path is defined as $\phi$ and the diameter of the balls is defined as Da, the gap G between the balls located in the circulation path and the inner wall of the circulation path is represented by the following expression (1):

$$G = \phi - Da \qquad (1)$$

Further, assuming that A indicates the positional dimension from the center line of the slider body 1 to the center line of the circulation path straight portions 5 and B indicates the positional dimension from the center line of the end cap 2 to the center of the opening in the circulation path curved portion 6, the diameter of the circulation path substantially coincides with L0 in the fitted portion when as shown in FIG. 13, the positional dimensions coincide with each other (A=B), and assuming that the length of the portion in which the diameter of the circulation path changes to effect fitting is $\Delta$, the gap in the fitted portion, i.e., the gap between the balls and the inner wall of the circulation path, is represented by the following expression (2):

$$G = (\phi^2 + \Delta^2)^{1/2} - Da \qquad (2)$$

Further, when as shown in FIG. 14, the error of the positional dimensions is A−B, L1 and L2 are conceivable as the substantial diameters in the circulation path, but the diameters in question are great in absolute amount. In this case, L2>L1 and therefore, when the extension of the portion in which the diameter of the circulation path created without the slider body and the end cap closely contacting with each other changes is defined as δ, the gap in question is represented by the following expression (3):

$$G = \{[\phi + (A-B)]^2 + (\Delta + \delta)^2\}^{1/2} - Da \qquad (3)$$

That is, the gap between the inner wall of the circulation path in the fitted portion and the balls increases in conformity with an increase in the dimensional difference between A and B and the resultant increase in δ.

The increase in the gap between the inner wall of the circulation path and the balls is an increase in the magnitude of the amount of play when the balls pass the fitted portion, and this causes the collision of the balls against the wall surface of the circulation path. This problem particularly remarkably arose outside the orbit of revolution of the balls, and as the result, it increased the noise created during the running of the linear guide device, i.e., when the slider body moved on the guide rail.

SUMMARY OF THE INVENTION

The present invention has as its object to provide a linear guide device which decreases the play of balls relative to the orbit of revolution thereof to thereby decrease the collision of the balls against the wall surface of a circulation path and suppress the noise during the running of the device.

In order to solve the above-noted problem, the present invention provides a linear guide device comprising a guide rail having in the outside thereof a first groove portion extending axially and supporting a plurality of rolling members for rolling therein, and a slider having a second groove portion opposed to the first grove portion and constituting a space in which the rolling members roll and a circulation path communicating with the space formed by the first and second groove portions and constituting an endless track for circulating the plurality of rolling members therein, and supported on the guide rail through the rolling members in the second groove portion and sliding on the guide rail by the plurality of rolling members rolling in the space, the slider being comprised of a slider body having a circulation path straight portion constituting the second groove portion and a part of the circulation path independently of the second groove portion, and two end caps mounted on the opposite end portions of the slider body and having circulation path curved portions constituting the endless track by being communicated with each other in the opposite end portions of the space formed by the first and second groove portions and the circulation path straight portion, characterized in that the end caps further have in the opening portion of the circulation path curved portions communicating with the circulation path straight portion a substantially cylindrical convex portion disposed so as to extend the circulation path curved portions toward the circulation path straight portion and divided into at least two, and the slider body has in the opening portion of the circulation path straight portion communicating with the circulation path curved portions a substantially cylindrical concave portion corresponding to the substantially cylindrical convex portion for the slider body and the end caps to constitute faucet-fitting.

According to the present invention, even when in the communicating portion of the circulation path straight portion and the circulation path curved portion, an error occurs to their positional dimensions, the divided cylindrical convex portion of the end caps faucet-fitted to the slider body is deformed when fitted and therefore, a gap in the lengthwise direction of the fitted portion which may pose a problem in the prior art is not created or it becomes possible to make the gap small. The substantially cylindrical convex portion increases its deformation potential by being divided, and it becomes possible to more improve the closely contacting property between the slider body and the end caps related to the endless track.

However, the closely contacting property of the faucet-fitted portion is improved by the deformation of the divided cylindrical convex portion, while on the other hand, there occurs a case where a level difference is created in the circulation path by the deformation and hinders the smooth rolling of the balls. So, in order to achieve the above object, in the linear guide device according to the present invention, in the cylindrical convex portion used as the faucet-fitted portion, the inner edge portion of the tip end portion thereof toward the circulation path may be formed with a taper for enlarging the opening diameter toward the tip end portion. This tapered portion may form a chamfered or curved surface.

DESCRIPTION OF THE PREFERRED EMBODIMENT

An embodiment of the present invention will hereinafter be described with reference to the drawings.

Figure 1:
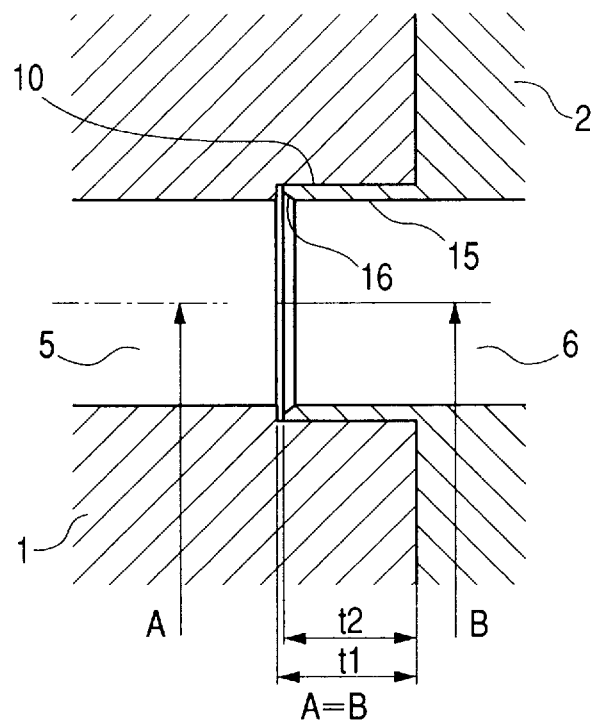
FIG. 1 is a schematic cross-sectional view of the faucet-fitted portion of a slider body and end caps in an embodiment of the present invention showing a case where there is little or no error of positional dimension in the communicating portion of a circulation path straight portion and a circulation path curved portion.
Figure 2:
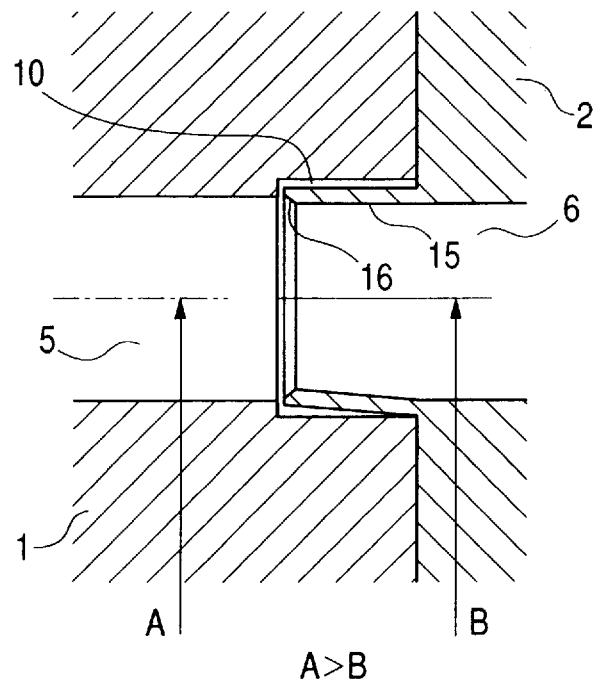
FIG. 2 is a schematic cross-sectional view of the faucet-fitted portion of the slider body and the end caps in an embodiment of the present invention showing a case where there is an error of the positional dimension in the communicating portion of the circulation path straight portion and the circulation path curved portion.

FIGS. 1 and 2 are schematic cross-sectional views of the faucet-fitted portion of a slider body and end caps in an embodiment of the present invention showing a case where there is little or no error of the positional dimension in the opening portion of a circulation path straight portion and the opening portion of a circulation path curved portion (FIG. 1) and a case where there is an error (FIG. 2), respectively.

In FIGS. 1 and 2, the reference numeral 1 designates a slider body, the reference numeral 2 denotes end caps, the reference numeral 5 designates a circulation path straight portion, the reference numeral 6 denotes a circulation path curved portion, the reference numeral 10 designates a substantially cylindrical concave portion, the reference numeral 15 denotes a substantially cylindrical convex portion, the reference numeral 16 designates a tapered portion provided on the tip end of the substantially cylindrical convex portion, the letter A indicates the positional dimension from the center line of the slider body 1 to the center line of the circulation path straight portion 5, and the letter B indicates the positional dimension from the center line of the end caps 2 to the center of an opening in the circulation path curved portion 5.

The length t1 of the substantially cylindrical concave portion 10 in the slider body 1 shown in FIG. 1 is slightly greater than the length t2 of the cylinder portion of the substantially cylindrical convex portion 15 in the end caps 2 fitted thereto.

In the present embodiment when as shown in FIG. 2, there is an error between the positional dimension A of the circulation path straight portion 5 and the positional dimension B of the opening portion of the circulation path curved portion 6, the substantially cylindrical convex portion 15 is deformed so as to flex into the circulation path straight portion 5 during fitting to thereby make the close contact between the slide body 1 and the end caps 2 possible. In this case, the deformed portion of the substantially cylindrical convex portion 15 has its tip end portion protruded into the circulation path straight portion 5, but when the error of the positional dimension is great, there may occur a case where further in the non-deformed portion, the substantially cylindrical convex portion 15 is disposed in the circulation path straight portion 5.

Accordingly, a sufficient closely contacting property between the slider body 1 and the end caps 2 is obtained, while on the other hand, a level difference portion is created on the circulation path in the fitted portion, and this may lead to the problem that the smooth rolling of balls is hindered. In the present embodiment, a chamfered portion 16 is formed on the inner peripheral portion of the tip end portion of the substantially cylindrical convex portion 15 and a clear level difference is eliminated on the inner surface of the circulation path to thereby obtain the smooth rolling of the balls.

Figure 3:
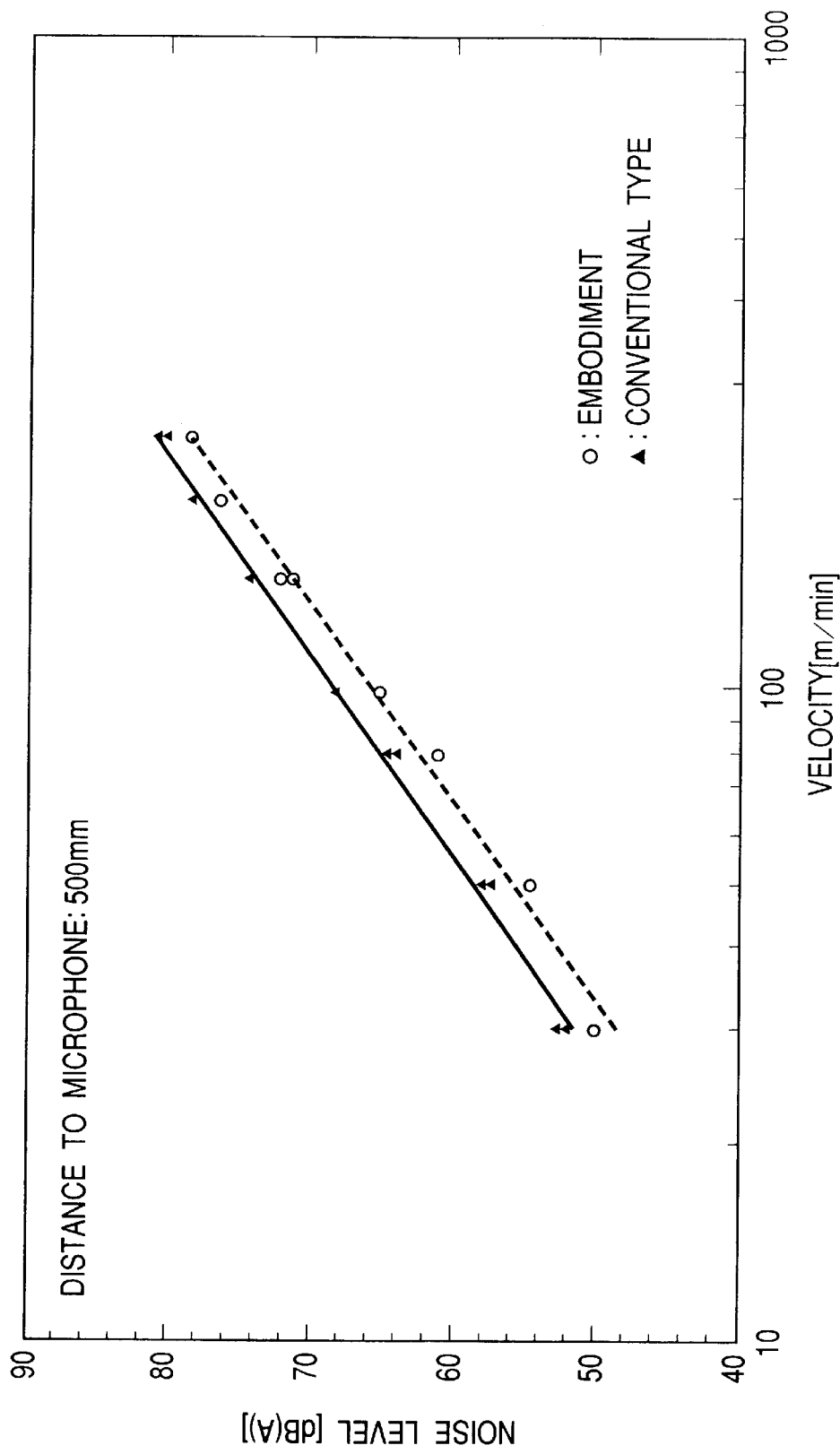
FIG. 3 shows the noise reducing effect by an embodiment of the present invention.

The effect of the above-described embodiment is shown in FIG. 3. FIG. 3 shows the relations between the sliding velocity and the noise level in the linear guide device according to the present invention having the faucet-fitting and the chamfered portion of the tip end of the substantially cylindrical convex portion and the linear guide device according to the prior art having no faucet-fitted portion. As is apparent from FIG. 3, it is seen that in all velocity areas wherein a test was carried out, the noise level of the linear guide device according to the present invention is smaller than that of the linear guide device according to the prior art.

Figure 4:
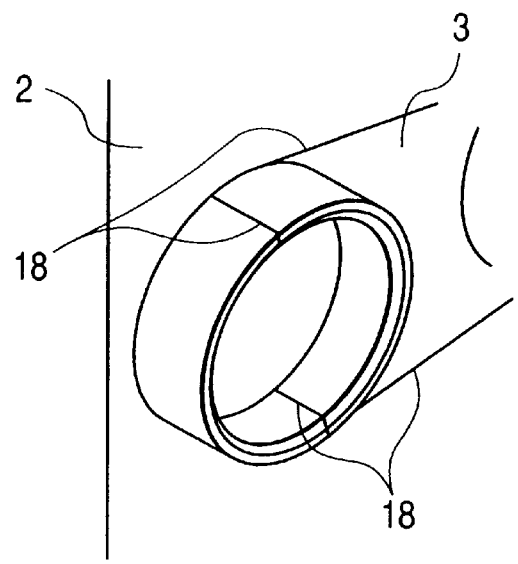
FIG. 4 is a schematic view showing the combined state of an end cap and a return guide in an embodiment of the present invention.

In the present embodiment, the circulation path curved portion 6 and substantially cylindrical convex portion 15 in the actual slider are not comprised of the end caps 2 singly, but as shown in FIG. 4, are constructed by the end caps 2 and the return guide 3 being joined together on joined surfaces indicated by 18.

Figure 5:
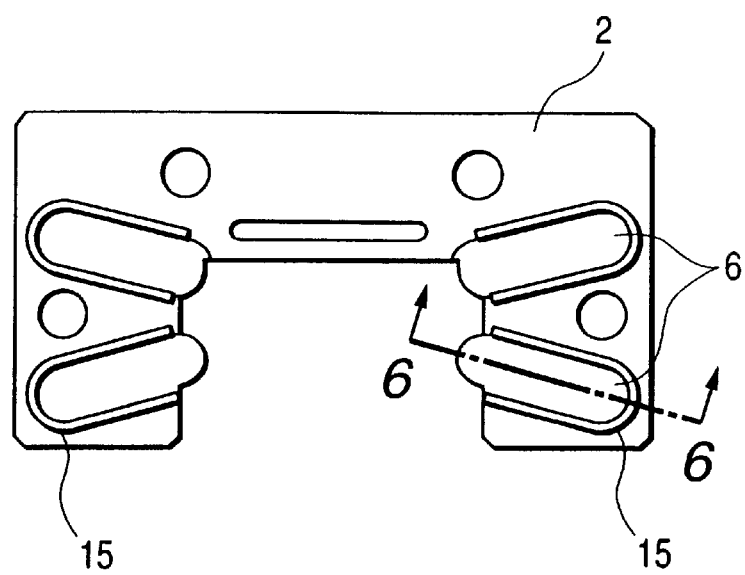
FIG. 5 is a schematic view of the end surface of an end cap in an embodiment of the present invention as it is seen from the direction of the joined surface thereof with a slider body.
Figure 6:
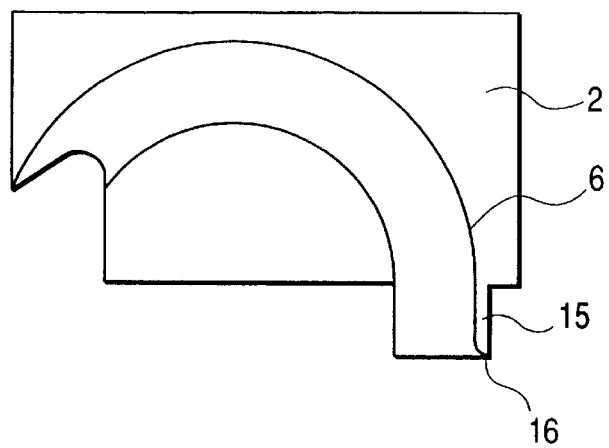
FIG. 6 is a cross-sectional view along the line 6—6 in the fitting convex portion and circulation path curved portion of the end cap shown in FIG. 5.
Figure 7:
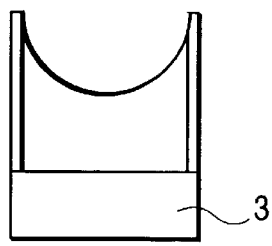
FIG. 7 is a side view of the return guide.
Figure 8:
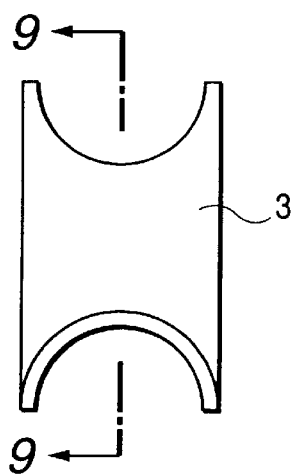
FIG. 8 is a rear view of the return guide.
Figure 9:
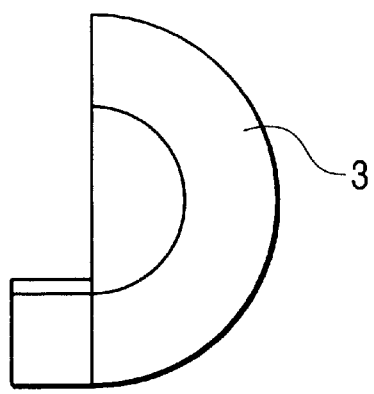
FIG. 9 is a cross-sectional view of the return guide along the line 9—9 of FIG. 8.

For reference, a schematic view of the end cap in the present embodiment as it is seen from the joined surface with the slider is shown in FIG. 5, and a schematic view of the cross-section on the line 6—6 of FIG. 5 as it is seen from a direction perpendicular to the cross-section is shown in FIG. 6. Also, a side view, a rear view and a cross-sectional view of the return guide 3 as it is seen from a direction perpendicular to the cross-section on the line 9—9 of the rear view are shown as FIGS. 7, 8 and 9, respectively.

Figure 10:
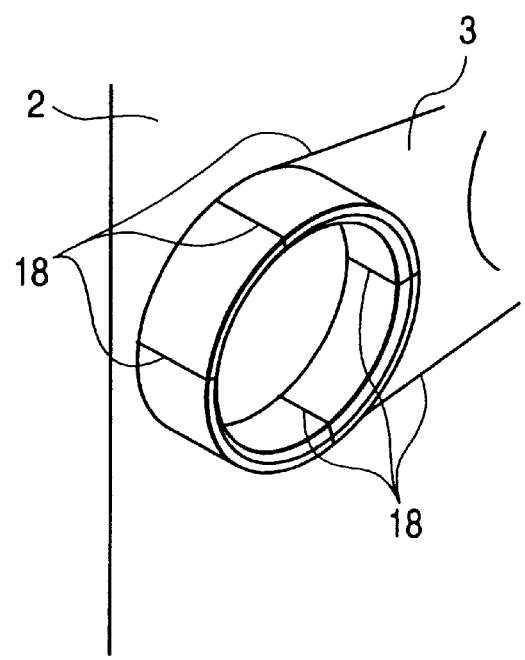
FIG. 10 is a schematic view showing another combined state of the end cap and the return guide.
Figure 11:
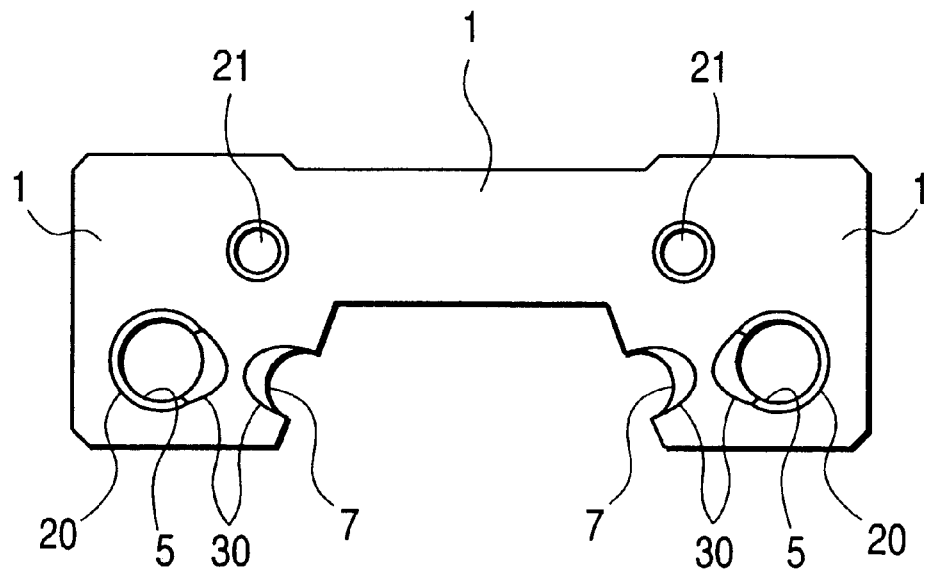
FIG. 11 is a view of the end surface of a slider body joined with an end cap in the prior art as it is seen from the direction of joint.
Figure 12:
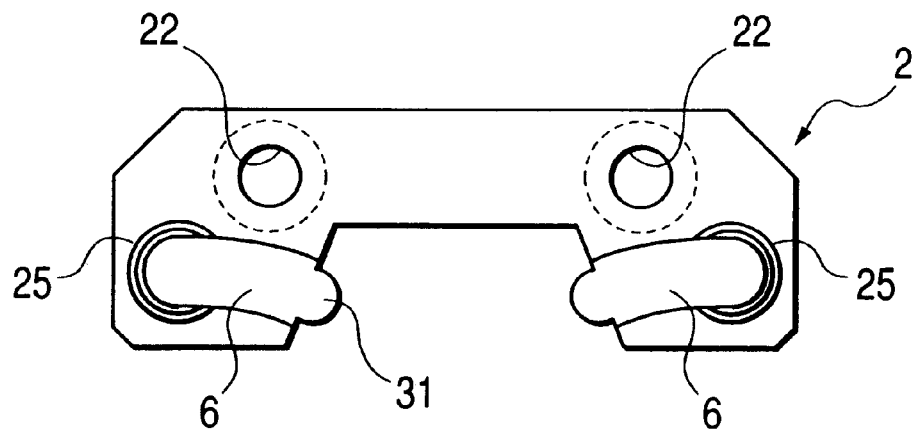
FIG. 12 is a view of the end surface of the end cap joined with the end surface of the slider body in the prior art as it is seen from the direction of joint.
Figure 13:
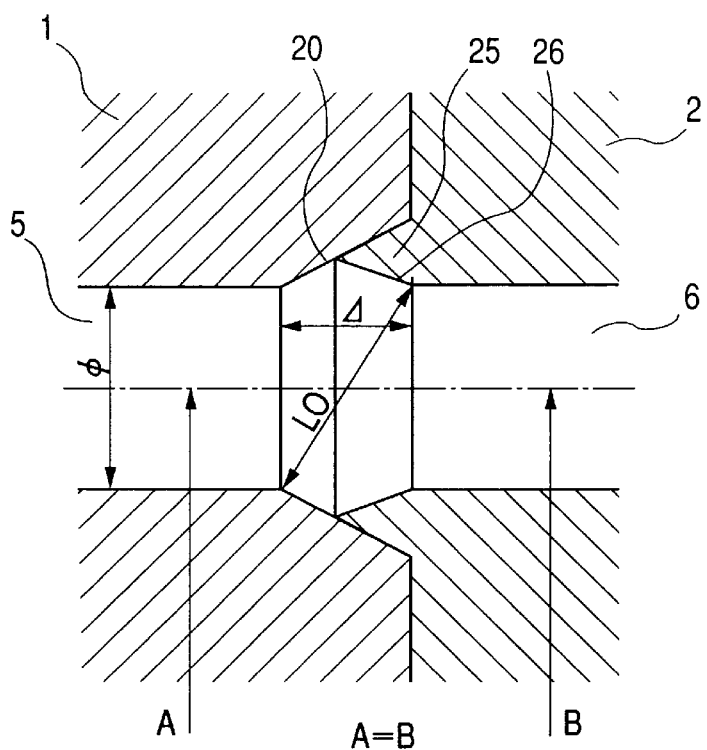
FIG. 13 is a schematic cross-sectional view of the faucet-fitted portion of the slider body and the end caps in the prior art showing a case where there is little or no error of the positional dimension in the communicating portion of a circulation path straight portion and a circulation path curved portion.
Figure 14:
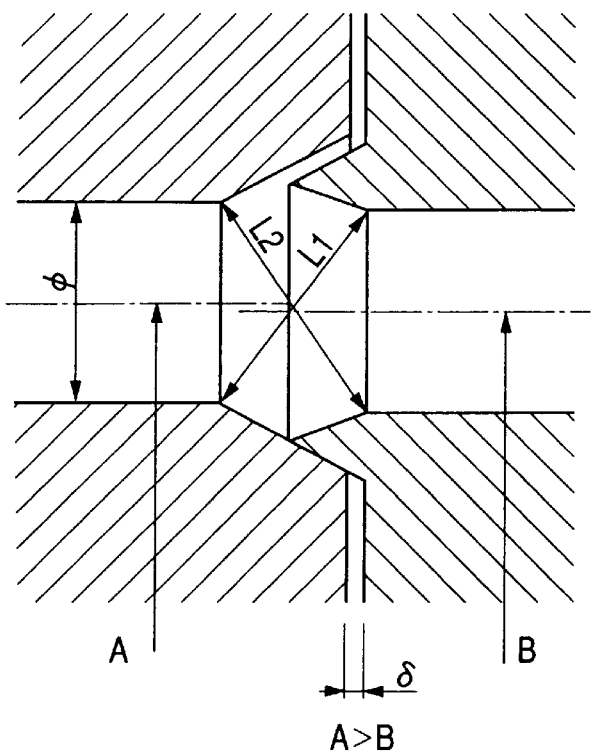
FIG. 14 is a schematic cross-sectional view of the faucet-fitted portion of the slider body and the end caps in the prior art showing a case where there is an error of the positional dimension in the communicating portions of the circulation path straight portion and the circulation path curved portion.
Figure 15:
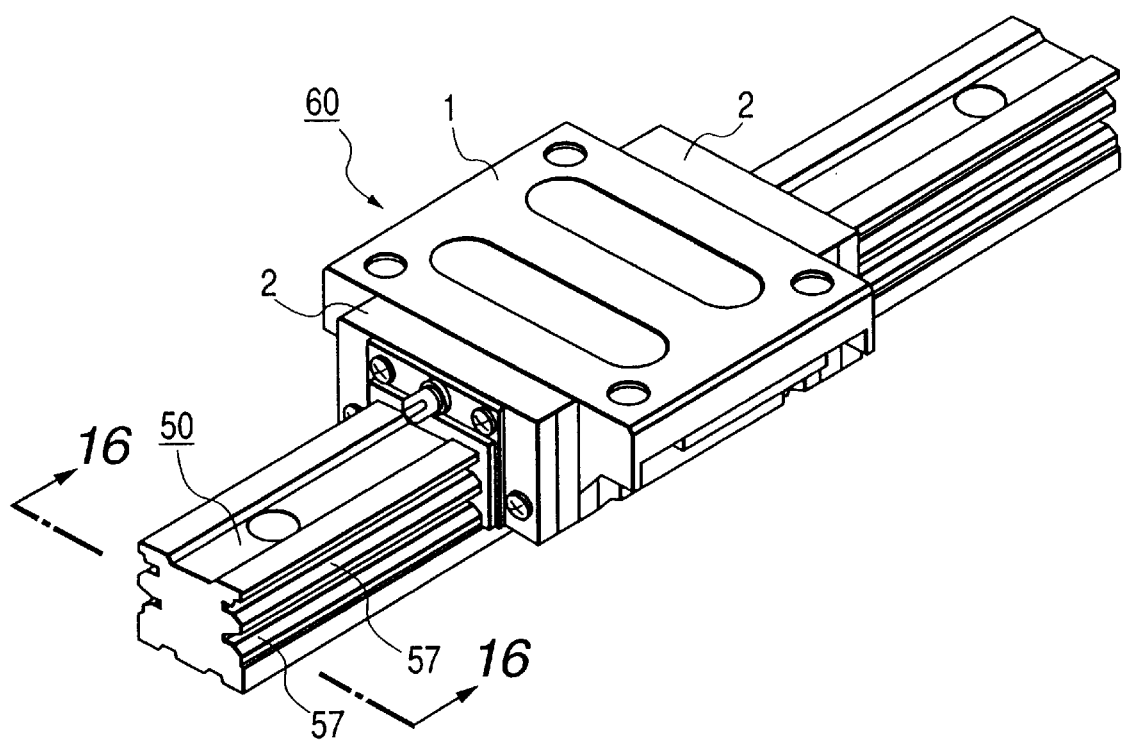
FIG. 15 shows the appearances of a linear guide device.
Figure 16:
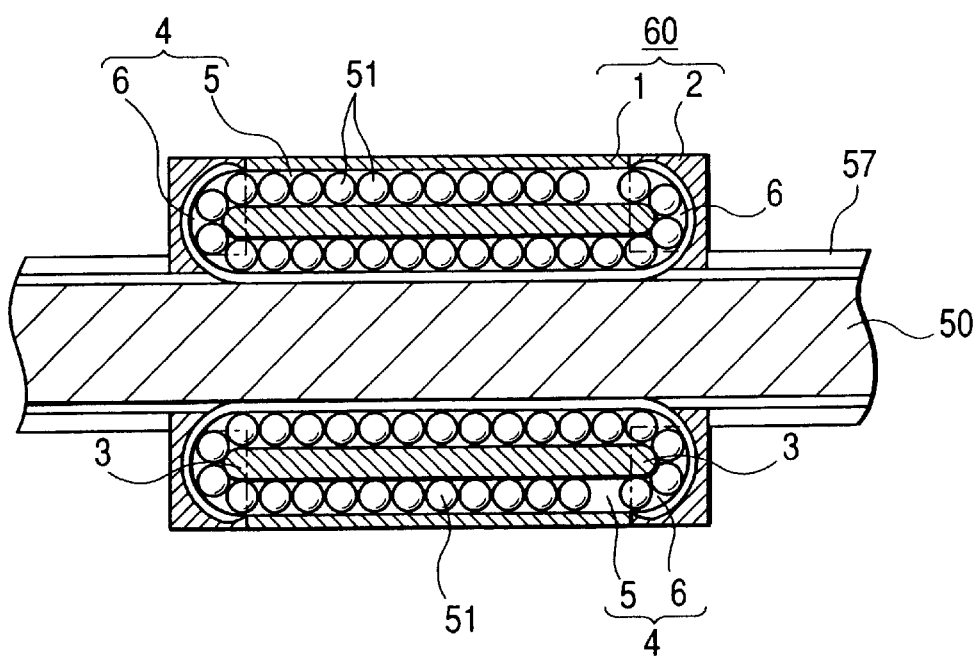
FIG. 16 is a cross-sectional view taken along the line 16—16 of FIG. 15 and showing the internal structure of the linear guide device.

The chamfered portion 16 formed on the tip end portion of the cylindrical convex portion 15 may be square-chamfered, R-chamfered or more greatly tapered. Also, the division of the substantially cylindrical convex portion may be one forming a gap on the joined surfaces 18 as shown in FIG. 4, and further, the division is not limited to division into two parts, but may be division into four parts as shown in FIG. 10 or division into more parts.

Further, when the substantially cylindrical convex portion 15 is to be fitted to the substantially cylindrical concave portion 10, a tapered portion increasing its opening diameter toward the opening may be further provided in the opening portion of the substantially cylindrical concave portion 10 in order to facilitate the fitting work.

According to the present invention, the communicating portion of the circulation path straight portion in the slider body and the circulation path curved portions in the end caps is constructed by the faucet-fitting of the substantially cylindrical convex portion divided into at least two, whereby it becomes possible to absorb the error created in the positional dimensions in the communicating portion by the elastic deformation of the substantially cylindrical convex portion or the like. Thereby, the slider body and the end caps can be easily fixed to each other without any gap being created therebetween, and the play or the like of the balls in the communicating portion in the circulation path can be eliminated to thereby reduce the noise during the running of the linear guide and improve the quality and productivity of the linear guide.

What is claimed is:

1. A linear guide device comprising a guide rail having a first groove portion extending axially and supporting a plurality of rolling members for rolling therein, and a slider having a second groove portion opposed to said first groove portion to provide a space in which said rolling members roll and a circulation path communicating with said space formed by the first and second groove portions and forming an endless track for circulating said plurality of rolling members therein, and supported on said guide rail through said rolling members in said second groove portion and sliding on said guide rail by said plurality of rolling members rolling in said space, said slider being comprised of a slider body having said second groove portion and a circulation path straight portion independently of said second groove portion, and two end caps mounted on opposite end portions of said slider body and having circulation path curved portions to provide said endless track by being communicated with each other in opposite end portions of said space formed by said first and second groove portions and said circulation path straight portion, characterized in that said end caps further having, at an opening portion of said circulation path curved portions communicating with said circulation path straight portion, a first convex portion disposed so as to extend said circulation path curved portions toward said circulation path straight portion, a part of said circulation path curved portions, including said first convex portion is composed of surfaces that are one-piece portions of said end caps, and another part is composed of surfaces of return guides on said end caps, said return guides have in the opening portion of said circulation path curved portions communicating with said circulation path straight portion a second convex portion disposed so as to extend said circulation path curved portions toward said circulation path straight portion, said first convex portion of said end caps and said second convex portion of said return guides form a substantially cylindrical convex portion, and said slider body has in an opening portion of said circulation path straight portion communicating with said circulation path curved portions a substantially cylindrical concave portion to receive said substantially cylindrical convex portion for said slider body and said end caps to constitute faucet-fitting.

2. A device according to claim 1, wherein said substantially cylindrical convex portion is formed with a tapered portion increasing its opening diameter toward the tip end portion of said circulation path straight portion in the inner edge portion of said tip end portion.

3. A linear guide device slider comprising a slider body having end caps, the slider body and the end caps forming a continuous recirculation path for guiding a plurality of rolling members, the continuous recirculation path having straight portions in the slider body which communicate with curved portions in the end caps, each curved portion being composed of first surfaces that are one-piece with an end cap and second surfaces of a return guide on that end cap, each curved portion terminating in a substantially cylindrical convex part extending into a corresponding substantially cylindrical concave part of a straight portion, the convex part being divided to permit deformation of the convex part for fitting into the concave part.

4. A device according to claim 3, wherein said substantially cylindrical convex part has a tip that is tapered to increase an inside diameter of said convex part as it approaches said concave part.

* * * * *